(12) United States Patent  
Maity et al.

(10) Patent No.: US 12,393,693 B2  
(45) Date of Patent: Aug. 19, 2025

(54) SYSTEM FOR QUERY-BASED INTERACTIVE RISK MODEL ANALYSIS FOR SECURE SOFTWARE DEVELOPMENT

(71) Applicant: EMC IP Holding Company LLC, Hopkinton, MA (US)

(72) Inventors: Soumya Maity, Bengaluru (IN); Lokesh Balu Sudakar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 444 days.

(21) Appl. No.: 17/380,918

(22) Filed: Jul. 20, 2021

(65) Prior Publication Data

US 2022/0382878 A1    Dec. 1, 2022

(30) Foreign Application Priority Data

May 27, 2021    (IN) .............................. 202111023662

(51) Int. Cl.
| | |
|---|---|
| *G06F 21/57* | (2013.01) |
| *G06F 16/245* | (2019.01) |
| *G06F 16/28* | (2019.01) |
| *G06T 11/20* | (2006.01) |

(52) U.S. Cl.  
CPC .......... *G06F 21/577* (2013.01); *G06F 16/245* (2019.01); *G06F 16/288* (2019.01); *G06T 11/206* (2013.01); *G06F 2221/033* (2013.01); *G06F 2221/034* (2013.01); *G06T 2200/24* (2013.01)

(58) Field of Classification Search  
None  
See application file for complete search history.

(56) References Cited

U.S. PATENT DOCUMENTS

| | | | |
|---|---|---|---|
| 9,529,863 B1* | 12/2016 | Gindin | G06Q 40/00 |
| 10,705,695 B1* | 7/2020 | Porath | G06F 3/0486 |
| 2017/0289187 A1* | 10/2017 | Noel | G06F 16/9024 |
| 2019/0332607 A1* | 10/2019 | Leung | G06F 16/254 |
| 2021/0141831 A1* | 5/2021 | Sherman | C12C 11/06 |

* cited by examiner

*Primary Examiner* — Jeffrey C Pwu  
*Assistant Examiner* — Mayasa A. Shaawat  
(74) *Attorney, Agent, or Firm* — Workman Nydegger (57) ABSTRACT

One example method includes receiving a user query that relates to a potential vulnerability of a product, and the product includes hardware and/or software, based on information in the user query, ingesting multiple different datasets from different respective data sources, using data in the datasets to generate a respective graph model corresponding to each dataset, identifying relationships among the datasets, and building, and presenting to a user, a visualization that graphically displays each graph model, and indicates relationships between the datasets, and relationships between the data sources.

16 Claims, 6 Drawing Sheets

SYSTEM FOR QUERY-BASED INTERACTIVE RISK MODEL ANALYSIS FOR SECURE SOFTWARE DEVELOPMENT

FIELD OF THE INVENTION

Embodiments of the present invention generally relate to threat analysis in hardware and software environments. More particularly, at least some embodiments of the invention relate to systems, hardware, software, computer-readable media, and methods for analyzing data from different threat intelligence platforms to generate, in response to a user query, a comprehensive threat picture.

BACKGROUND

A Security Development Lifecycle (SDL) may ensure that a software product is resilient to any known attacks. Security controls are building blocks for SDL. Choosing the right set of security controls is an art and heavily dependent upon the contextual insight of the security SME (Subject Matter Expert) who is expected to know all the possible attacks on the developed system. This is a difficult job, at least in part because there are so many different types of threat information in so many different formats coming from many different sources. To illustrate, some example threat information sources include STIX for Threat Intelligence, Threat Model for Design flaws, CWE for Weakness classes, CVE for vulnerability database, CAPEC for attack categories, ATT & CK for red-teaming, and many more. Given the disparities in the types and sources of threat data, and as noted in the following discussion, it has proven difficult to generate a model or approach that adequately captures and renders this information in a way that enables timely and effective action to be taken with regard to threats.

One current problem in the art is that security approaches are overly dependent upon the expertise of the SME. Particularly, selection of appropriate security control for a software product is not optimal and depends on various factors including involvement and availability and competence of Security SMEs, which in turn affects the speed and agility of embedding security into software design, development and deployment.

Another problem concerns a lack of understanding of threats that may be posed. Particularly, determining relevant security control and its suitability for a given context is subjective, as control selections are often made with only limited understanding, on the part of the decision maker, of the spectrum of risk context.

As another example, it may be difficult or impossible to identify any correlation among the various types of threat data. Particularly, the effectiveness of a selected control cannot be mapped or correlated to threat, vulnerability, attack and weakness information available in the public domain. The lack of such capabilities may lead to additional cost in designing and implementing SDL control, which may be non-optimal due to such problems.

As noted, it has proven difficult, if not impossible, to create an overall comprehensive model of a threat picture. Currently, there is significant limitation on how various risk elements manifest and the relationship among those risk elements is not clearly understood. There is no known single view or perspective of the spectrum of risks that accounts for the interconnection and correlation of various taxonomies that contribute to risk.

A further problem in the art concerns threat data ingestion. Particularly, there are multiple data sources for risk and threat related intel provided by different organizations and forums. The volume of threat data is constantly increasing, and ingesting these rapidly growing data in an attempt to generate a risk model is a challenge.

Finally, a heterogeneity of ingested threat data is problematic. For example, different data sources model the risk and threat data in different ways. Ingesting threat data from different sources is a significant challenge to creation of a single data model.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to threat analysis in hardware and software environments. More particularly, at least some embodiments of the invention relate to systems, hardware, software, computer-readable media, and methods for analyzing data from different threat intelligence platforms to generate, in response to a user query, a comprehensive threat picture.

In general, example embodiments of the invention may be configured to interact with an SDL platform. In some example embodiments, various types of heterogeneous threat-related data, from different sources, may be ingested. The data sources may be public and/or private. The respective data from the various sources may then be rendered in a visual form, such as graphs for example. A visualization model may then be created, and presented to a user, that includes the data graphs and maps relationships between the different data sets. One or more user queries may then be received, and the visualization model may be updated or modified to display the results of the user queries. Based on the query results, the user may then take various actions, including implementation of a set of optimized security controls for a software product in development. At least some embodiments may be implemented in an 'as a Service' model that may be available to a user by way of various mechanisms, such as the customer accessible Dell Technologies Apex Console.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that such embodiments may implement query-based interactive analytics that may enable a user to identify and implement, in hardware and software products, controls to reduce or eliminate the vulnerability of the hardware and software products to various threats. An embodiment may enable a user to identify controls based on a visual representation of multiple different datasets that include threat information. An embodiment may relate, such as in a visual manner, a variety of different security threat and risk related data from multiple different data sources. An embodiment may enable a user to define a control profile for software and/or hardware by providing the user with a holistic representation of all risk/threat data that may be relevant to the software/hardware.

A. Overview

While working with security threats, vulnerabilities, attack models, and controls, a developer and/or user may have access to multiple sources of contextual information. All these pieces of information are a disjoint dataset. As a result, visualizing the entire model and relationships between its components may be challenging. Moreover, finding a proper correlation and causality between these data nodes is extremely difficult.

The problem is often not lack of available information, but rather the ability to assemble disparate pieces of information into an overall picture for situational awareness, optimal courses of action, and maintaining mission readiness. Security analysts and operators can be overwhelmed by a variety of consoles from multiple tools; each tool provides only a limited view of one aspect of the overall space under consideration.

As such, some example embodiments are directed to a framework for analyzing and modeling correlated data between different threat intelligence platforms ingested from different data sources. The framework may be queried by a user to obtain information, which may be visually presented, that may be used in the development and implementation of security controls for hardware and/or software. This framework may use a graph database and a graph-based visualization. A unified model as may be generated by embodiments of the invention may simplify the complexity of understanding the diverse set of heterogenous data sets, and may simplify the use of this data in a way that positively impacts the resilience of software and hardware with respect to threats.

B. Aspects of Some Example Embodiments

Software and hardware development programs may be aligned with various industry standards, such as the principles outlined in ISO/IEC 27034. An enterprise may have a large number, as many as 50-100, or more, of recommended controls for cloud, firmware, hosted applications and products. Every control may focus on different risk profiles, and each control may impose an overhead and cost on the development teams. In addition to its internal requirements, an enterprise may also collaborate through many industry standards and community initiatives like SAFECode, BSIMM, CSA, FIRST, MITRE, and OWASP. Thus, an enterprise development program may consumes a significant volume of security threat and risk related data from various sources. This volume of data imposes a heavy burden on a security SME who may be required, but simply be unable, to understand and analyze data from those sources, and then identify optimal set of controls for the team, software, and/or hardware, based on the risk-profile. Moreover, the challenge is exponentially increasing due to the rapidly changing technology and threat landscapes, and the disjoint nature of various contextual data-sources such as internal threat models, PSIRT/CRIST alerts, multiple scan results, CWE/CVE, ATT & CK, and CAPEC for example.

In light of considerations such as those noted above and elsewhere herein, some example embodiments are directed a system for software security analytics and visualization. Some particular embodiments may be directed to a unified analytic system to perform analytic query for relevant information related to potential and actual threats, defenses, and mission impacts from multiple disjoint and isolated datasets. This system may capture incremental data for attack vulnerability, weakness, security events, internal threat models and controls to provide a predictive model for adopting and prioritizing on risk-based SDL controls. Overall, this framework may provide a holistic picture of a consolidated and correlated data from different bodies like MITRE, NVD, NIST, CMMI, Common Criteria, ISO and community initiatives like OWASP, and SAFECODE, for example.

Figure 1:
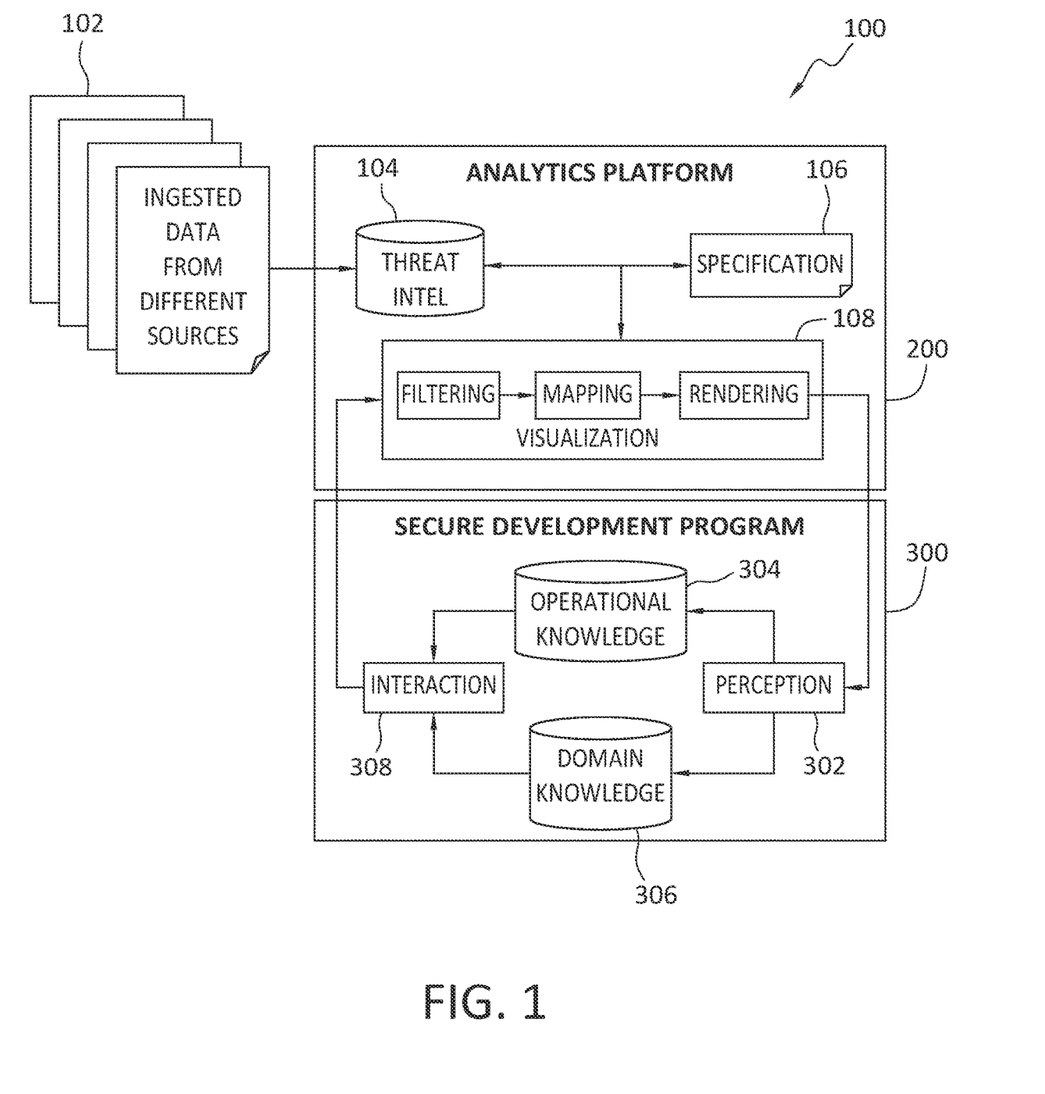
FIG. 1 discloses aspects of an example architecture, including an analytics platform according to some embodiments.

With reference now to FIG. 1, an example architecture 100 according to some embodiments is disclosed. In general, the example architecture may operate to embed security throughout the lifecycle of a product or application so that the products and applications are built securely and remains secure. The example architecture 100 may implement analysis activities such as threat modeling, static code analysis and security testing to discover and address security defects throughout the development lifecycle.

The example architecture 100 may comprise and/or ingest data from a variety of different data sources 102. The data may concern hardware and/or software and may include, among other things, attack vulnerability data, security threat data, data regarding weaknesses, data relating to malware, data concerning security events such as attempted and/or successful attacks, and internal threat models, and any other information relating to the security of hardware and/or software in development, or already deployed.

The example architecture 100 may further comprise an analytics platform 200 and a secure development platform 300. In general, the data ingested from the data sources 102 may be processed and evaluated by the analytics platform 200, possibly in response to one or more user queries, and the results of the analysis may be used to inform development of software by the secure development platform 300.

In more detail, heterogeneous data may be ingested by the analytics platform 200 from various different data sources 102 and stored in a database 104. The data may include any type/taxonomy of control/risks/threats/attacks/vulnerabilities. One or more specifications 106 may be used as a basis to parse the disparate incoming data and put the data in a form suitable for analysis. The parsed data, which may be normalized as well, may then be used by a visualization module 108 to build a series of graphs, each of which may correspond to a respective dataset.

In response to a user query, which may be received by way of the secure development platform 300, and/or on its own initiative, the visualization module 108 may create a visualization model, such as a graph-based model, that visually indicates relationships between and among the various datasets received from the data sources 102. For example, the output of the visualization module 108 may be visual and/or other indications of relationship between any node to any nodes, where a node is any type of security component. Creation of the visualization model may involve filtering, mapping, and rendering, of the parsed and normalized data. The visualization model may be agnostic with respect to the ingested data, that is, the visualization model may be created regardless of the type of data ingested, and regardless of the type of data sources 102. Thus, at least some embodiments of the analytics platform 200 may create graph-based models, rather than creating structured data.

With continued reference to FIG. 1, the secure development platform 300 may receive input from the analytics platform 200 such as, for example, one or more graphs of datasets and/or one or more visualization models. This input may be received and acknowledged by a perception module 302 and then fed to an operational knowledge database 304 and/or to a domain knowledge database 306. The operational knowledge database 304 may include information about how the deployed or in-development product operates, or is expected to operate, while the domain knowledge database 306 may include information about the domain(s) in which the product is deployed, or expected to be deployed. A user may receive, such as by way of an interaction module 308, information and insights from the operational knowledge database 304 and/or the domain knowledge database 306. Insights received by the user may be used in the development and implementation of one or more controls for a product such as a software product, and/or those insights may be fed back to the analytics platform 200 as an input to development and/or modification of a visualization module. By way of the interaction module 208, the user may also add his own insights concerning a visualization model, product, domain, operational information, and any other information that may be useful in development and/or modification of a visualization module.

Figure 2:
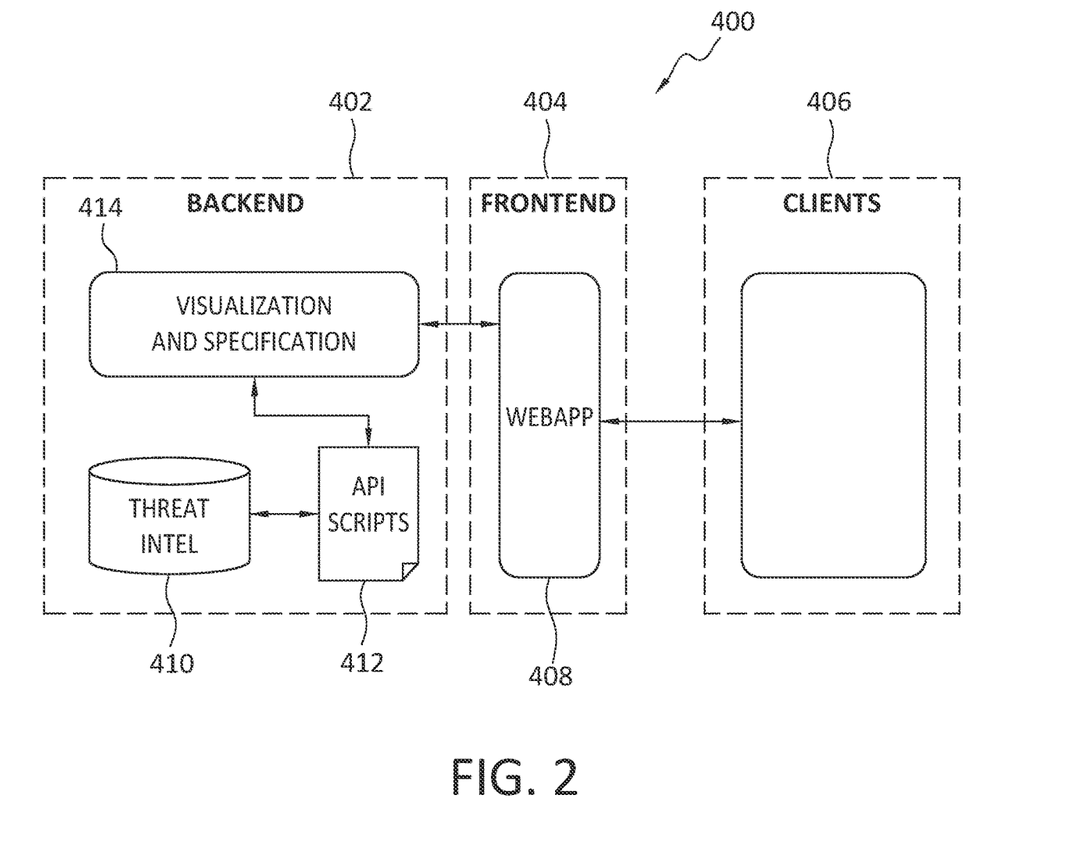
FIG. 2 discloses detailed aspects of an example analytics platform and interaction with a client.

Turning next to FIG. 2, an implementation overview of a framework architecture 400 is disclosed. As indicated, the architecture 400 may include a backend 402 that may comprise an analytics platform, such as the analytics platform 200 for example. A frontend 404 may facilitate communication and transfer of information between the backend 402 and one or more clients 406. As indicated in FIG. 2, embodiments of the architecture 400 may be operable with a variety of different clients 406. Among other things, the frontend 404 may receive queries from the clients 406 and may communicate the queries to the backend 402 for servicing. That is, the frontend 404 may create a gateway with the backend 402. As discussed in more detail below, such servicing may include, for example, generation of graph models and visualization models in accordance with parameters included in the client queries. Example clients 406 may include, but are not limited to, a web browser, PowerBI, Salesforce, ERP, JIRA, SDElement, CodeDX, and DefectJojo.

In some embodiments, the front end 404 may also ingest data from one or more of the clients 406, where such data may include, for example, any type/taxonomy of control/risks/threats/attacks/vulnerabilities. This data may be generated and/or gathered by clients during client operations.

As indicated, the frontend 404 may comprise and/or implement one or more webapps 408, such as REST (REpresentational State Transfer) web services, SOAP (Simple Object Access Protocol) and HTML (Hypertext Markup Language), for ingest, transform, and analytics including queries and visualization. The frontend 404 may ingest data from a variety of sources at all layers of its cyber knowledge stack, and the backed 402 may then map the ingested source-specific data to a common normalized data model. The backend 402 may also transform the isolated elements of the normalized data or model into a graph model that captures relevant relationships for the cybersecurity and mission dependence domains. The architecture 400 may also provide a variety of client-side analytic and visual capabilities, including graph dynamics, layering, grouping, filtering, and hierarchical views.

As further indicated in FIG. 2, threat intelligence data and information received during ingestion may be stored in a database 410 that may be accessible by scripts 412 employed for querying processes. Data retrieved from the database 410 in response to a query defined by a script 412, may be communicated, using the script 412, to a visualization and specification module 414. In the example configuration of FIG. 2, neo4j may be used for graph modeling and graph database, NodeJS for a UI (User Interface) of a client 406, and Python for API (Application Program Interface) scripts. The database 410 may include information in a Neo4j format, although no particular format is required. The script 412 may be written in Python, but that is not required.

In the architecture 400, the threat and risk model schema may be free to evolve with changes in the available data sources and desired analytics, rather than being fixed at design time. The data model may be based on a flexible property-graph formulation, which may be implemented in Neo4j. Model extensions, that is, updates to the model, may simply comprise the creation of additional nodes, relationships, and properties in the property-graph data model, and may require no schema changes or other database renormalizing. Graph pattern-matching queries may be expressed in either native language, or Neoj4 query language (Cypher).

As discussed in more detail below, a significant challenge in consolidating control models is the lack of a common standard. However, that approach is limited by the data structure schema and volume of the data. Also, conversion from one data format to another is always a computational overhead. Embodiments of the invention may eliminate that limitation by using graph models, as explained in connection with FIG. 3.

Figure 3:
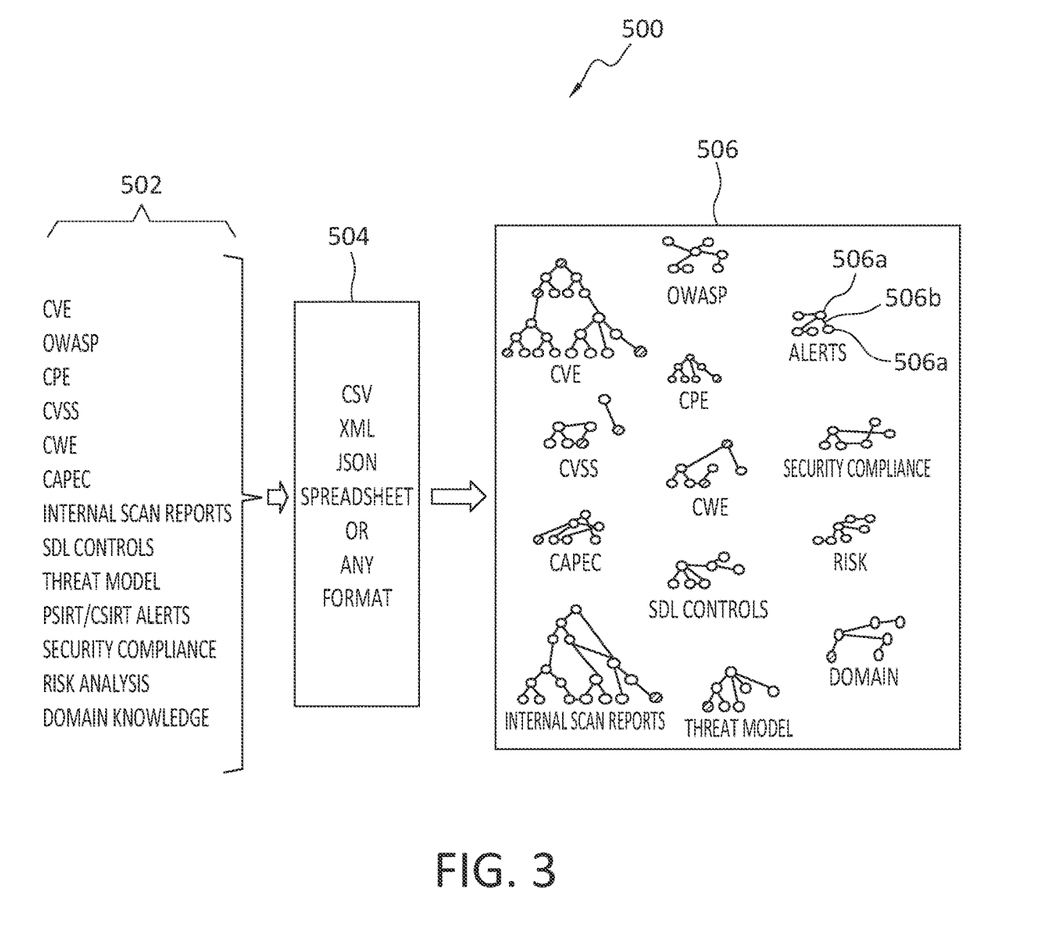
FIG. 3 discloses an example of heterogeneous data ingestion.

FIG. 3 provides further details of an example configuration 500 for ingesting and processing data. As shown there, data of various different types and formats may be ingested from a variety of different sources 502, and normalized into a common format 504, examples of which are indicated in FIG. 3. The normalized data may then be used to generate a number of source-specific graph models 506. Each of the graph models 506 may comprise, for a respective ingested dataset, a mapping of one or more nodes 506a, and relationships 506b between nodes 506a. For example, the nodes 506a may each represent a different type of alert, such as may be issued when a system becomes aware of a problem, and 506b indicates that the alerts denoted by 506a are related to each other in some way. For example, one alert 506a may be an alert indicating that a hacking attempt has been detected, and the related alert 506a may be an alert to a user that the resource that was attacked should be shut down.

With continued reference to the example of FIG. 3, example embodiments may implement query-based information retrieval, from multiple datasets, and interactive analytics. In brief, the analytic query formation may enable a user to obtain insights from the various threat intelligence platforms that generated the ingested data. As such, example embodiments may provide the capability to conduct query based interactive analytics for just-in-time prevention of weakness in a software product via optimal selection of appropriate controls for implementation in the software product.

Any kind of queries, such as CVE to CWE correlation for example, can be constructed and applied on the resultant graph which produces insights. Note that as used herein CWE (Common Weakness Enumeration) refers to a listing of common software and hardware weaknesses that can occur in architecture, design, code, or implementation. Such weaknesses may present security vulnerabilities. Also, as used herein, CVE refers to a list of publicly disclosed cybersecurity vulnerabilities that users may access to gain insights about how to avoid or eliminate vulnerabilities in hardware, software, and services.

There is no limit to the types and number of queries that may be formulated and used. The following are a few examples: Query—what are the products that uses C # and still have buffer-overflow vulnerability?; Query—What is minimal set of controls adopted by SDL to resolve an injection attack?; Query—What is the number of attacks on an application in 2020 that bundles SUSE Linux?; and, Query—What are the vulnerabilities in an application that was not found by the internal security scans?. While the answers to such queries may be difficult, or impossible, for a security SME to fully and timely answer, embodiments of the invention may provide such answers in a complete and timely manner.

Note that embodiments of the invention may not require the use of a new query language, and the native query language used by Neo4.1 may be used for formulation of queries. As shown in FIG. 3, embodiments of the invention may generate individual graph-based data models, also referred to herein as 'graph models,' using the data received from the data sources, and then ingesting the graph models to the analytics platform, an example of which is denoted at 200 in FIG. 1.

Figure 4:
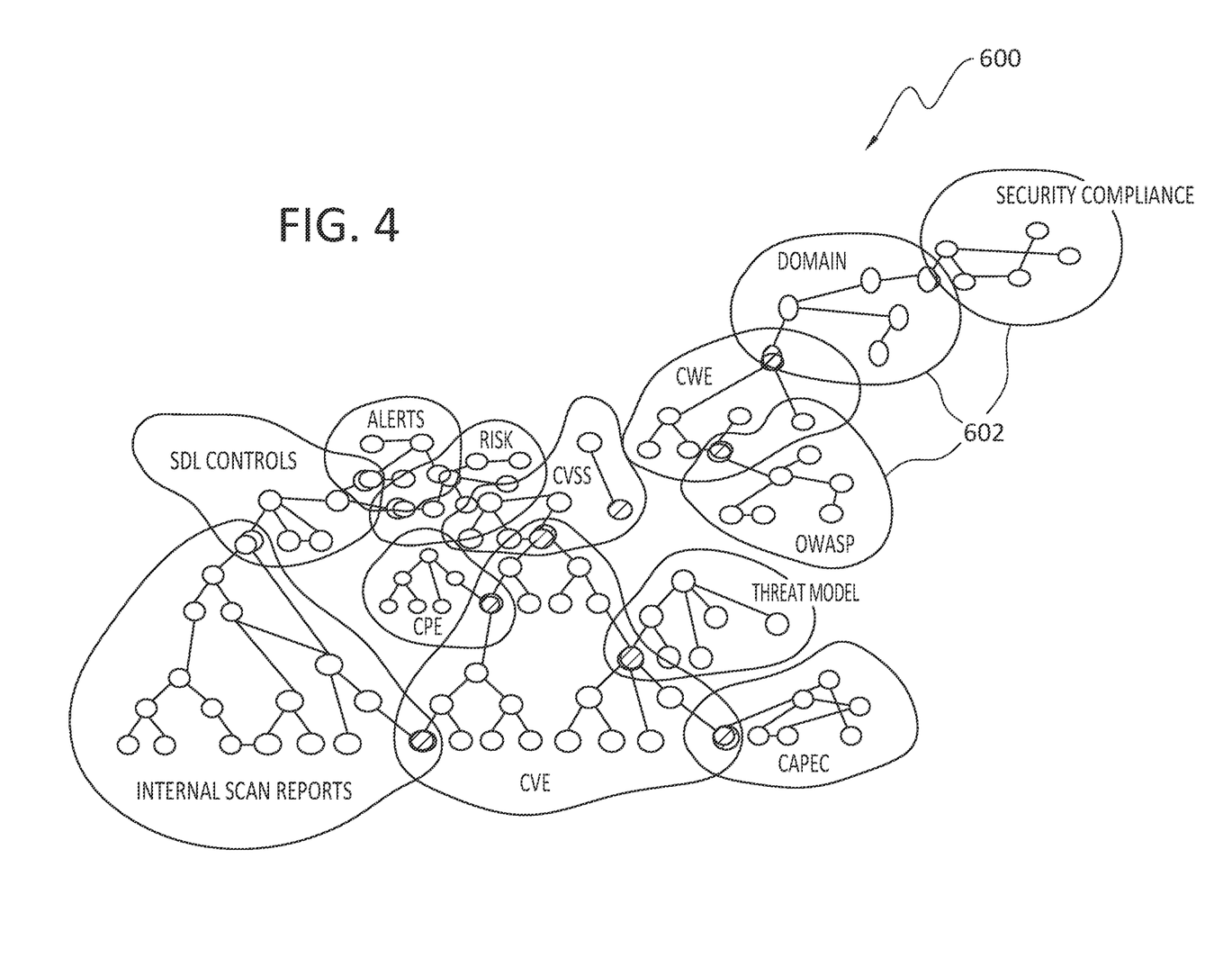
FIG. 4 discloses a visualization that includes a convergence of multiple graph models.

With reference next to FIG. 4, an example visualization 600, or 'master graph,' is disclosed. A visualization such as is disclosed in FIG. 4 may be generated in response to a user query. As shown, the visualization 600 may comprise a convergence of multiple different graph models 602, examples of which are disclosed in FIG. 3. Each of the graph models 602 may retain its identifying information, such as 'Internal Scan Reports,' 'CVE,' 'CPE,' 'SDL Controls,' 'Alerts,' 'Risk,' 'CVSS,' 'OWASP,' 'CWE,' 'Domain,' 'Threat Model,' and 'Security Compliance,' for example. In this way, a user looking at the visualization 600 may readily determine which graph model corresponds to which data. As well, because the graph models are converged in FIG. 4, the user may also be able to readily determine relationships between and among various graph models and their respective corresponding data types and data sets. With this information, a user may select one more controls to be implemented in software/hardware that is in development, or already deployed.

C. Further Discussion

As disclosed herein, example embodiments may implement a schematic model to help users visually understand the convergence of heterogenous data sets, and such embodiments may interactively visualize spectrum of risks from the ingested data. Aggregation of different individual graphical elements into a single unified graph is easier and finding a relationship between them is also faster. By using graph models, embodiments of the invention may reduce the complexity of the convergence of the data model to a polynomial order.

As well, embodiments of the invention may implement a free flowing schema. Most of the threat intelligence tools limit the possibilities of the data models by applying a specified schema. Insofar as some example embodiments may employ graph-based modeling, the data model is free flowing and is not limited by any perimeters and bounded by any fixed schema. A schema may change every time a new dataset is converged, and thus create new possibilities of relationships between nodes, and among datasets.

Further, example embodiments may create individual graph-based data models from the data sources, and then ingesting the graph models to the framework, or analytics platform. There may be multiple platforms for providing different levels of data about different levels of threat, risk, vulnerability, weakness and security controls. All of this information and data may be ingested into a common database, irrespective of the data-format of the ingested data types, and of the database schema.

As well, typical approaches for consolidating control models tend to focus on converting the data format into a standard. However, such an approach is limited by the data structure schema and volume of the data. Also, conversion from one data format to another typically introduces a computational overhead. Embodiments of the invention may overcome these limitations by using graph models.

Further, example embodiments may enable holistic risk visualization. Particularly, such embodiments may provide a simple and easy way to achieve convergence of various risk-based data sets, and automatically build the risk context using graph models generated based on the datasets. Example embodiments may also provide the capability for a user to visualize a spectrum of risks in a graph-based schema. This visual depiction of the security control posture may be richer and more explanatory in nature, as compared with models that do not employ visual elements.

Finally, embodiments may provide for a query-based interaction with all the possible data-sources, and perform user-driven analyses that may will provide insights about security risks by analyzing different heterogeneous data about the business, controls, threats, and vulnerabilities, for example. Example embodiments also embrace a system for building and presenting, to a user, a holistic risk model that can facilitate interactive query-based analysis.

D. Example Methods

Figure 5:
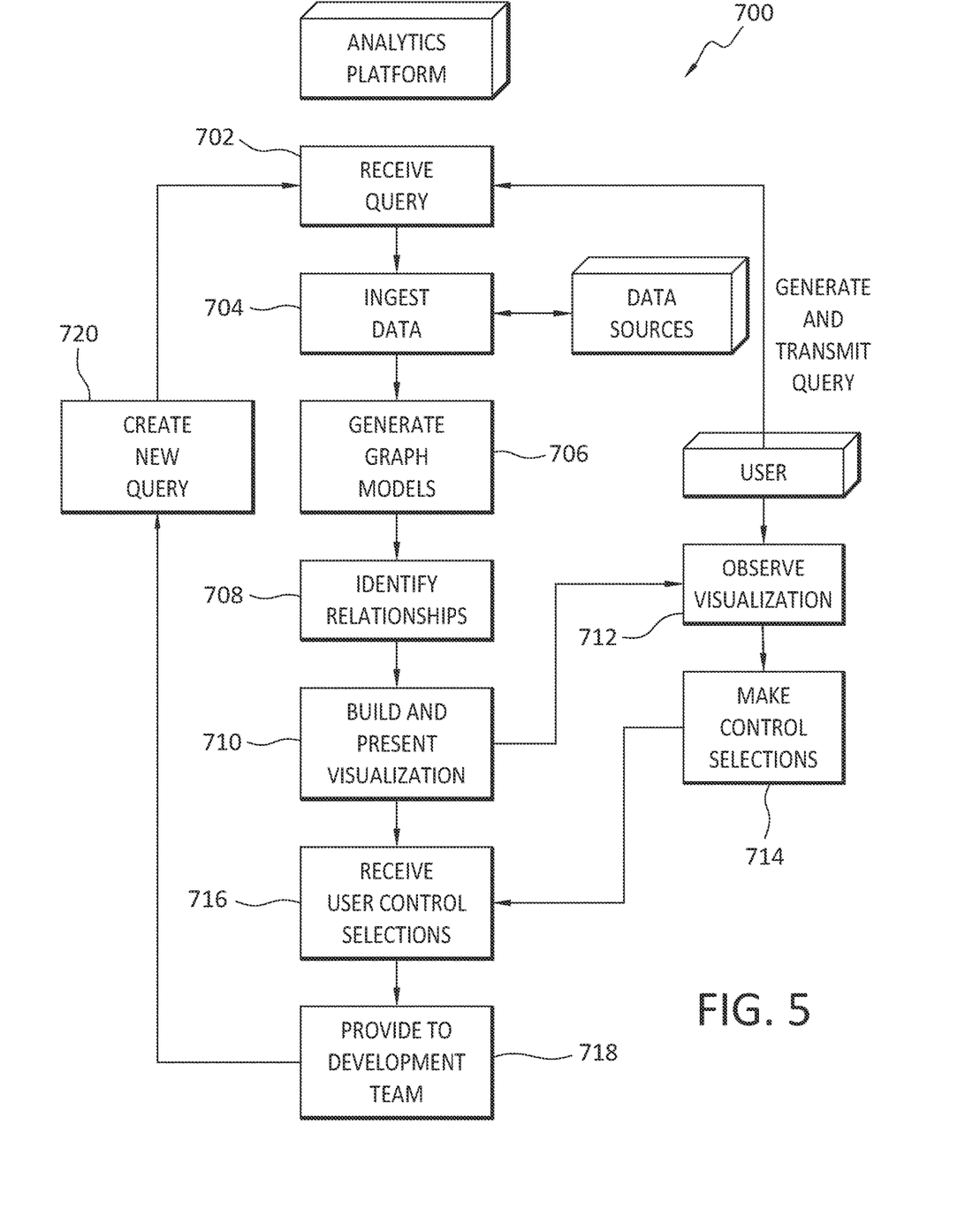
FIG. 5 discloses aspects of an example method for query based analytics.

It is noted with respect to the example method of FIG. 5 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 5, an example method according to some embodiments is denoted generally at 700. The method 700 may begin with receipt of a user query 702 by an analytics platform, from a user. In response to the user query, the analytics platform may ingest data 704 from a variety of sources. The ingested data may be of several different types depending, for example, on the nature of the source from which the data was obtained. In some embodiments, data ingestion 704 may precede receipt 702 of the user query.

The analytics platform may then use the ingested data to generate one or more graph models 706. In some embodiments, a respective graph model is generated that corresponds to each of the data sources that generated the ingested data. For example, a data source X and data source Y may each generate respective datasets. Since the data sources X and Y are different from each other, the datasets may be different from each other as well, both in terms of format and content. Accordingly, respective graph models may be generated 706 for the data source X data, and for the data source Y data.

After the graph models have been generated 706, the analytics platform may identify any relationships 708 between/among, for example, nodes respectively associated with the datasets, and/or relationships between/among the different datasets. For example, in some embodiments, a node may generate a dataset and, as such, the node may function as a data source.

Using the relationship information that was generated 708, the analytics platform may then build and present, to a user by way of a user interface for example, a visualization 710. The visualization may comprise a visual convergence of multiple different graph models, and may indicate, for example, the relationships between/among nodes, and/or relationships between/among datasets, for example. As well, the visualization may present user-selectable controls, where the controls presented may be included in the visualization by virtue of the relationships indicated in the visualization. Thus, as a visualization is modified based on new/modified queries and/or changes to the datasets and/or data sources, the relationships, datasets, and controls, may accordingly vary.

A user may then visually observe 712, such as by way of a display for example, the visualization. Using information presented in the visualization, the user may then select 714 one or more controls. The controls may be implied by information displayed as part of the visualization, and/or the visualization may explicitly display user-selectable controls. Next, the analytics platform may receive 716 one or more user control selections. The user selections may then be provided 718 to a development team for incorporation in software/hardware that is in development, and/or incorporation in software/hardware that is already deployed.

At this point, the method may return to create a new query 720 and then to 702 and/or any other process between 702 and 718. For example, if a modified query is received 702, part or all of the method 700 may be repeated. As another example, if new/modified data has been generated that needs to be ingested, the method 700 may return to 704.

E. Further Example Embodiments

Following are some further example embodiments of the invention. These are presented only by way of example and are not intended to limit the scope of the invention in any way.

Embodiment 1. A method, comprising the operations: receiving a user query that relates to a potential vulnerability of a product, wherein the product comprises hardware and/or software; based on information in the user query, ingesting multiple different datasets from different respective data sources; using data in the datasets to generate a respective graph model corresponding to each dataset; identifying relationships among the datasets; and building, and presenting to a user, a visualization that graphically displays each graph model, and indicates relationships between the datasets, and relationships between the data sources.

Embodiment 2. The method as recited in embodiment 1, further comprising normalizing the ingested data prior to generation of the graph models.

Embodiment 3. The method as recited in any of embodiments 1-2, further comprising presenting, to the user, one or more user-selectable controls which, when implemented in the product, eliminates the potential vulnerability from the product.

Embodiment 4. The method as recited in embodiment 3, wherein the operations further comprise receiving, from the user, a selection of one of the user-selectable controls, and indicating the selection to a product development entity.

Embodiment 5. The method as recited in any of embodiments 1-4, wherein building the visualization comprises filtering, mapping, and rendering, information contained in the graph models.

Embodiment 6. The method as recited in any of embodiments 1-5, wherein the operations are performed by an analytics platform operable to interact with a secure software development platform.

Embodiment 7. The method as recited in any of embodiments 1-6, wherein the ingested data is heterogeneous.

Embodiment 8. The method as recited in any of embodiments 1-7, wherein the visualization is presented to a user by way of a graphical user interface.

Embodiment 9. The method as recited in any of embodiments 1-8, wherein the visualization is generated in response to, and based upon, the user query.

Embodiment 10. The method as recited in any of embodiments 1-9, wherein the operations further comprise automatically updating the visualization in response to addition of a new or modified dataset to the visualization.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
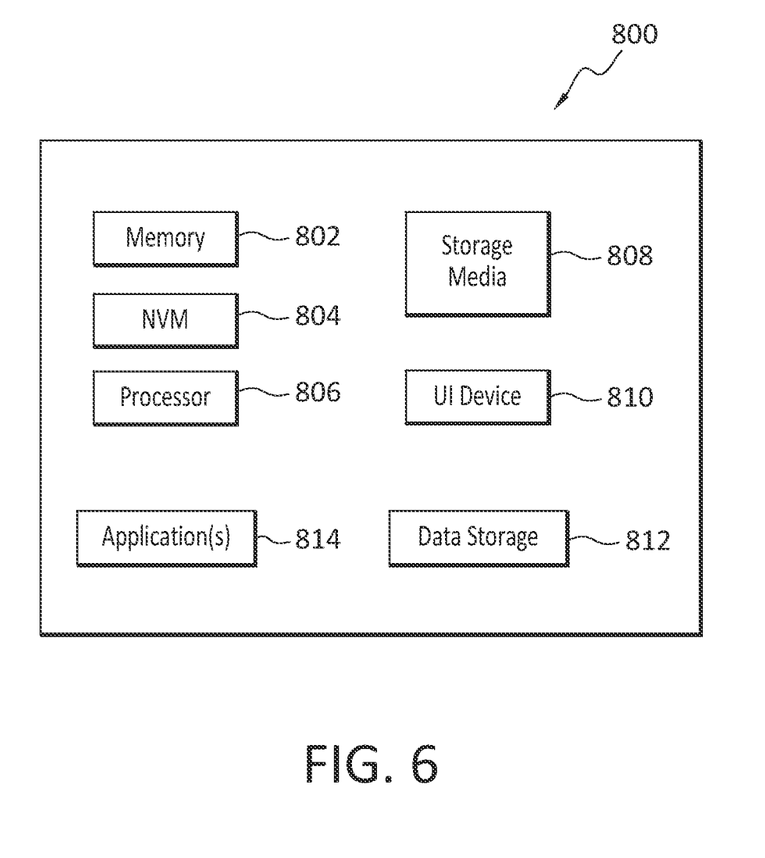
FIG. 6 discloses aspects of an example computing entity operable to perform any of the disclosed methods, processes, and operations.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 6.

In the example of FIG. 6, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 812 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising operations:
   receiving a user query that relates to a potential vulnerability of a product, wherein the product comprises hardware and/or software;
   based on information in the user query, ingesting data from multiple different datasets and different respective data sources;
   normalizing the ingested data;
   using the normalized data in the datasets to generate a respective graph model corresponding to each dataset;
   identifying relationships among the datasets;
   generating a visualization of a master graph which includes a convergence of multiple graph models by using the relationships which have been identified among the datasets; and
   building and presenting to a user the visualization of the master graph that graphically displays each graph model, and indicates relationships between the datasets, and relationships between the data sources, wherein the operations further comprise automatically updating the visualization in response to addition of a new or modified dataset to the visualization.

2. The method as recited in claim 1, further comprising presenting, to the user, one or more user-selectable controls which, when implemented in the product, eliminates the potential vulnerability from the product.

3. The method as recited in claim 2, wherein the operations further comprise receiving, from the user, a selection of one of the user-selectable controls, and indicating the selection to a product development entity.

4. The method as recited in claim 1, wherein building the visualization comprises filtering, mapping, and rendering, information contained in the graph models.

5. The method as recited in claim 1, wherein the operations are performed by an analytics platform operable to interact with a secure software development platform.

6. The method as recited in claim 1, wherein the ingested data is heterogeneous.

7. The method as recited in claim 1, wherein the visualization is presented to a user by way of a graphical user interface.

8. The method as recited in claim 1, wherein the visualization is generated in response to, and based upon, the user query.

9. A computer readable storage medium having stored therein instructions that are executable by one or more hardware processors to perform operations comprising:
receiving a user query that relates to a potential vulnerability of a product, wherein the product comprises hardware and/or software;
based on information in the user query, ingesting data from multiple different datasets and different respective data sources;
normalizing the ingested data;
using the normalized data in the datasets to generate a respective graph model corresponding to each dataset;
identifying relationships among the datasets;
generating a visualization of a master graph, which includes a convergence of multiple graph models by using the relationships which have been identified among the datasets; and
building and presenting to a user the visualization of the master graph that graphically displays each graph model, and indicates relationships between the datasets, and relationships between the data sources,
wherein the operations further comprise automatically updating the visualization in response to addition of a new or modified dataset to the visualization.

10. The computer readable storage medium as recited in claim 9, further comprising presenting, to the user, one or more user-selectable controls which, when implemented in the product, eliminates the potential vulnerability from the product.

11. The computer readable storage medium as recited in claim 10, wherein the operations further comprise receiving, from the user, a selection of one of the user-selectable controls, and indicating the selection to a product development entity.

12. The computer readable storage medium as recited in claim 9, wherein building the visualization comprises filtering, mapping, and rendering, information contained in the graph models.

13. The computer readable storage medium as recited in claim 9, wherein the operations are performed by an analytics platform operable to interact with a secure software development platform.

14. The computer readable storage medium as recited in claim 9, wherein the ingested data is heterogeneous.

15. The computer readable storage medium as recited in claim 9, wherein the visualization is presented to a user by way of a graphical user interface.

16. The computer readable storage medium as recited in claim 9, wherein the visualization is generated in response to, and based upon, the user query.

* * * * *

UNITED STATES PATENT AND TRADEMARK OFFICE
CERTIFICATE OF CORRECTION

| | | |
|---|---|---|
| PATENT NO. | : 12,393,693 B2 | Page 1 of 1 |
| APPLICATION NO. | : 17/380918 | |
| DATED | : August 19, 2025 | |
| INVENTOR(S) | : Soumya Maity et al. | |

It is certified that error appears in the above-identified patent and that said Letters Patent is hereby corrected as shown below:

In the Specification

<u>Column 4</u>
Line 19, change "an enterprise development program may consumes" to – an enterprise development program may consume –

<u>Column 5</u>
Line 51, change "interaction module 208" to – interaction module 308 –

Signed and Sealed this
Sixteenth Day of December, 2025

John A. Squires
*Director of the United States Patent and Trademark Office*